United States Patent
Inaba

[19]

[11] Patent Number: 6,036,320
[45] Date of Patent: Mar. 14, 2000

[54] STEREO SLIDE MOUNT

[76] Inventor: Minoru Inaba, No. 1116, Oaza Samukawa, Oyama-shi, Tochigi-ken, Japan

[21] Appl. No.: 09/014,457

[22] Filed: Jan. 28, 1998

[51] Int. Cl.[7] .................................................. G03B 21/14
[52] U.S. Cl. .................................... 353/120; 353/DIG. 5; 40/701; 40/705
[58] Field of Search .............................. 353/7, 9, 10, 97; 359/466, 467, 468, 473, 476, 477; 40/701, 704, 705, 706, 707

[56] References Cited

U.S. PATENT DOCUMENTS

| | | |
|---|---|---|
| 2,292,312 | 8/1942 | Wittel et al. . |
| 2,739,401 | 3/1956 | Balter . |
| 2,823,478 | 2/1958 | Ostergaard et al. . |
| 2,842,883 | 7/1958 | Folwell et al. ............................. 40/705 |
| 3,133,368 | 5/1964 | Perrot ....................................... 40/701 |
| 3,235,991 | 2/1966 | Harper et al. ............................. 40/705 |
| 3,242,605 | 3/1966 | Kleinschmidt ........................... 40/705 |
| 3,389,485 | 6/1968 | Roubal ..................................... 40/705 |
| 3,808,722 | 5/1974 | Byers et al. .............................. 40/705 |
| 4,104,818 | 8/1978 | Hrabik ...................................... 40/707 |
| 4,132,480 | 1/1979 | Reed ........................................ 40/701 |
| 4,314,416 | 2/1982 | Lorsch ..................................... 40/701 |
| 4,431,282 | 2/1984 | Martin geb. Boser ................. 353/120 |
| 5,392,548 | 2/1995 | Truc et al. ............................... 40/705 |

*Primary Examiner*—William Dowling
*Attorney, Agent, or Firm*—Fattibene & Fattibene; Paul A. Fattibene; Authur T. Fattibene

[57] ABSTRACT

A stereo slide mount intended to facilitate the mounting operation of a slide film and to improve the accuracy of the operation. A stereo slide mount 1 constructs its system of a plurality of kinds of stereo slide mounts 1 (#–E, - - -, and #E) in which the left and right apertures have an equal width W and an equal pitch PW and in which film positioning pines 6L and 6R formed on a base frame 2 and positioning pins 7L and 7R formed in a cover frame 3 have a pitch $P_P$ changed stepwise. The base frame 2 and the cover frame 3 are united by bringing the perforations of the film on the positioning pins 6L and 6R of the base frame 2 and by fitting the positioning pins in the pin holes 7L and 7R of the cover frame 3. The individual stereo slide mounts have different film offsets so that the parallax can be corrected to reproduce an accurate stereoscopic image by mounting the film on the mount having a numerals of the offset which is decided by a masking extent guide device.

2 Claims, 8 Drawing Sheets

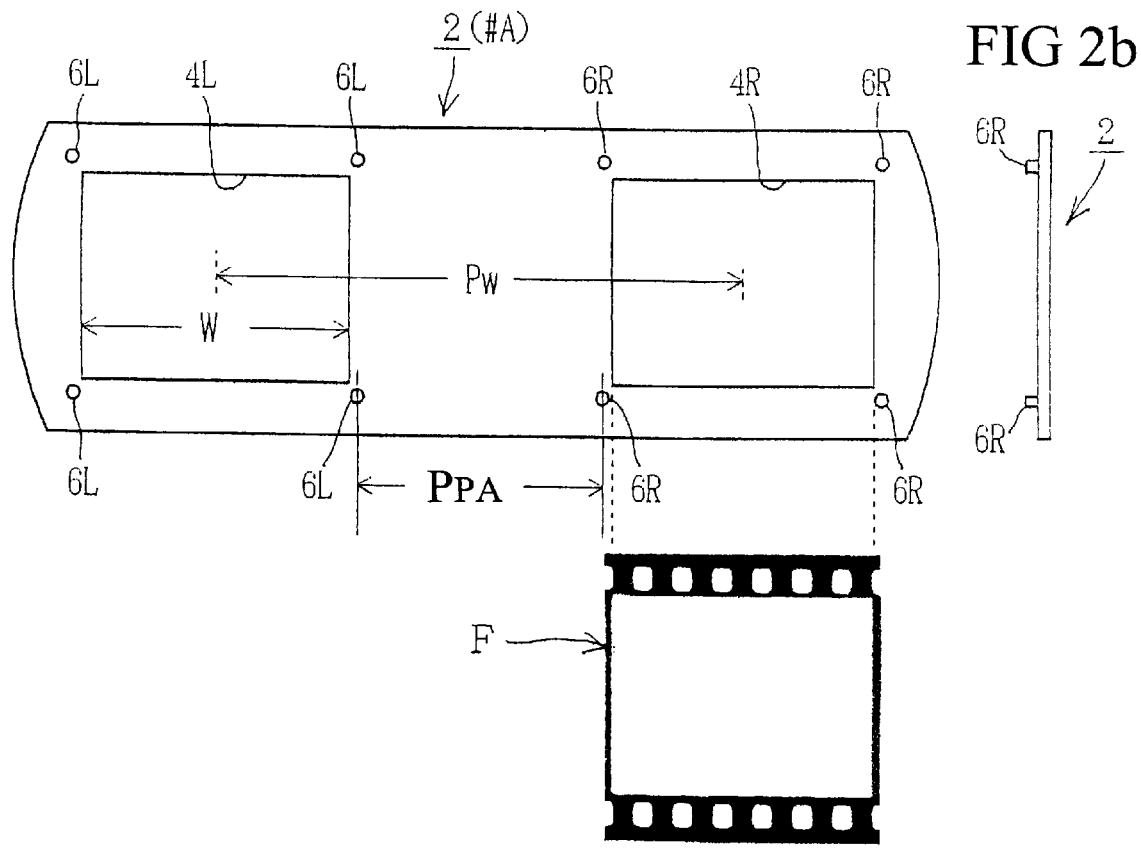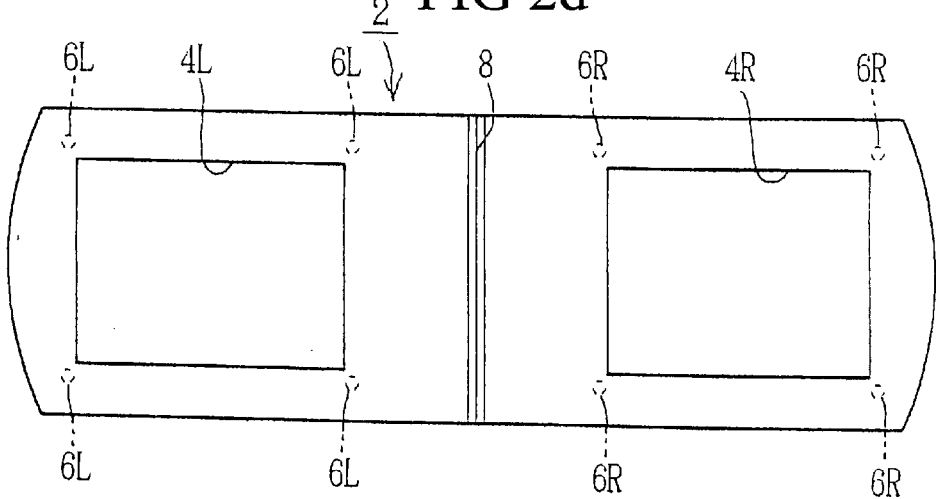

FIG 3a
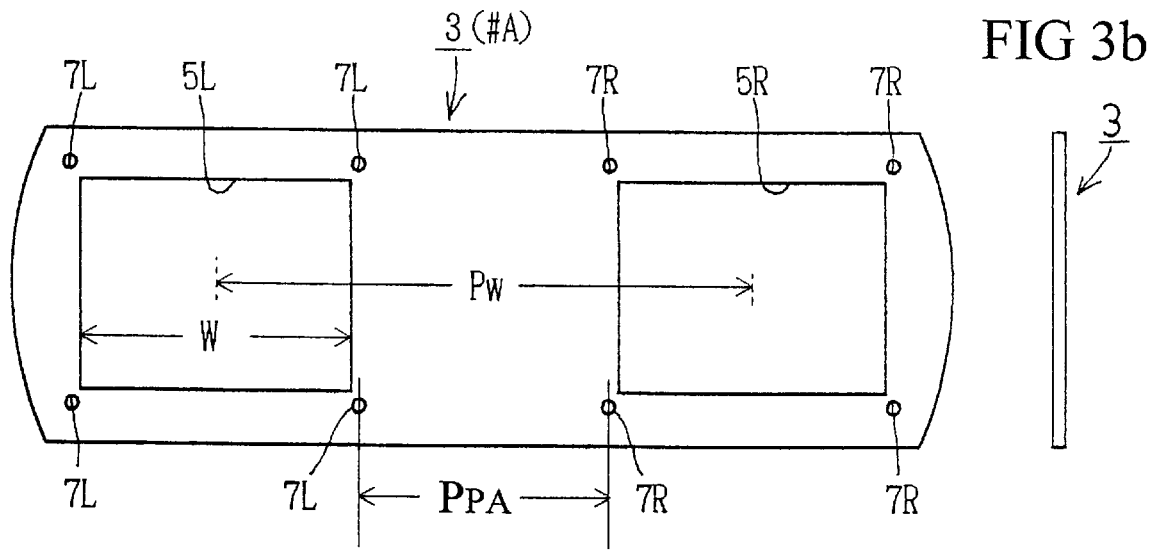
FIG 3b
FIG 3c
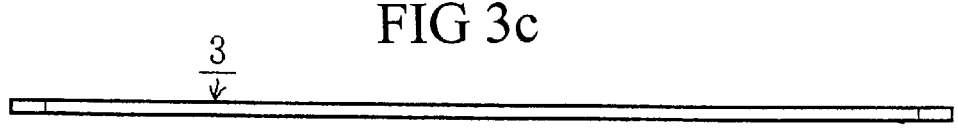
FIG 3d
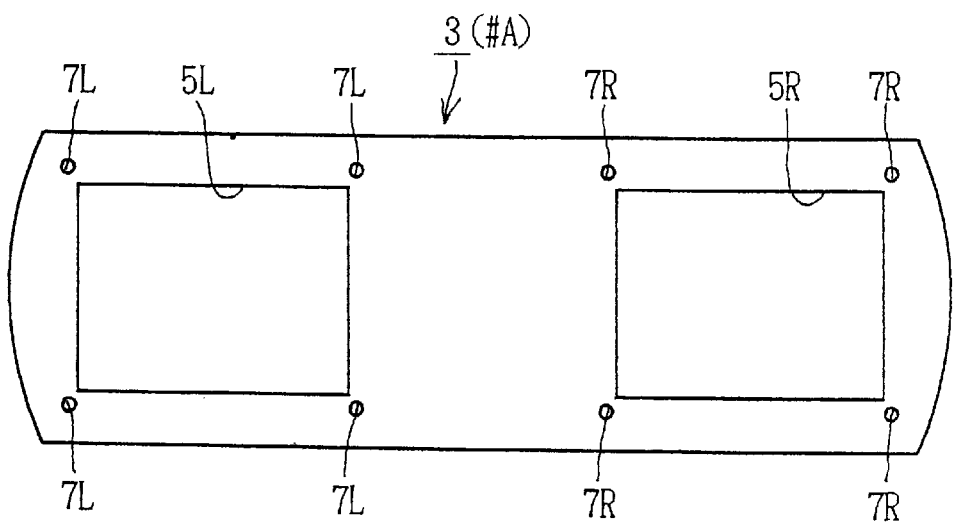

STEREO SLIDE MOUNT

FIELD OF THE INVENTION

The present invention relates to a stereo slide mount and, more particularly, to a stereo slide mount capable of providing a precise stereoscopic image by masking a image plane partially.

BACKGROUND OF THE INVENTION

In the stereo slide film on which an image is photographed by a stereoscopic camera of a structure having a fixed spacing between the optical axes of left and right lenses, non-superposed portions are left in the left edge portion of the left image plane and in the right edge portion of the right image plane in accordance with the subject distance by the difference in the field of view between the left and right photographic lenses.

For an observation with a stereo slide viewer, those non-superposed portions obstruct the view because of lack of the stereoscopic image. In order to eliminate this obstruction, there has been generally used a method of masking the non-superposed portions of the left and right image planes by making the image plane aperture width of the stereo slide mount narrower than the one image plane width of the stereo slide film.

The width of the non-superposed portions to be masked becomes the larger as the distance of the object, that will exert the most serious influence (although different according to the size, position, color, contrast and so on) upon the matching of the left and right images becomes shorter. Thus, the film is mounted by selecting the stereo slide mount having a proper image plane masking extent for each stereo slide film from a plurality of kinds of stereo slide mounts having aperture widths changed stepwise. Therefore, the film, on which an image has been photographed by an optical axis spacing fixed type stereoscopic camera, cannot avoid the loss in the image plane as a result of masking the image plane, and involves a defect that the loss in the image plane is increased at the time of a close shot.

On the other hand, the stereoscopic camera, which is equipped with a mechanism for adjusting the spacing between the optical axes of the left and right lenses, can adjust the fields of view of the left and right lenses so that it can correct the parallax according to the subject distance. It is, therefore, theoretically unnecessary to mask the outer edge portions of the left and right image planes with the slide mounts, so that a proper stereoscopic effect can be achieved if the films are uniformly mounted on the stereo slide mount having an aperture width equal to the image plane width of the films. However, even the film, on which an image has been photographed by the stereoscopic camera of the automatic optical axis spacing adjusting type or the manual optical axis spacing adjusting type, may be required to correct the perspective by masking the left and right image planes, as in the following case.

When an object having a serious influence upon the matching of the left and right images is photographed at a shorter distance than a main object, for example, the outer edge portions of the left and right image planes have to be masked to correct the perspective.

When the photograph is taken in the state of excess correction of parallax (for an excessively short optical axis spacing) by mistaking the adjustment of the optical axis spacing in the manual type optical axis spacing adjusting type stereoscopic camera, the perspective has to be corrected, contrary to the aforementioned case, by masking the inner edge portions of the left and right image planes.

However, the stereo slide film, on which an image has been photographed by the optical axis spacing adjusting type stereoscopic camera, is required to have an extremely small masking extent because the photograph is made in the state of the parallax corrected to some extent. Therefore, the suitable method is to mask a portion of the image plane by adjusting the offsets of the film for the apertures with the stereo slide mount which has a slightly smaller aperture width than the image plane width of the film.

In the stereo slide mount of the prior art, however, the film is positioned by bonding it to the base frame when the position of the film is adjusted with respect to the apertures of the mount. As a result, the positioning operation is difficult and provides no accuracy and is troublesome and inefficient.

Therefore, the invention has an object to solve the technical problem to be solved for providing a stereo slide mount which is both easy for the mounting operation and precise in the positioning operation.

SUMMARY OF THE INVENTION

According to the invention, as proposed for achieving the above-specified object, there is provided a stereo slide mount having identical relative positions between perforations and its individual paired left and right photographic image planes, for mounting a stereo slide film on which an image has been photographed by a stereoscopic camera, comprising:

a base frame and a cover frame each having two square apertures juxtaposed to each other, the base frame being provided on its film mounting face with positioning pins for coming into engagement with the perforations of the slide film to be fixed, to position two slide films, and the cover frame being provided in its film holding face with pin holes corresponding to the positioning pins, so that the base frame and the cover frame are jointed by fitting the positioning pins in the pin holes, wherein a mount system is constructed of a plurality of kinds of stereo slide mounts in which left and right apertures have an equal pitch and an equal width, in which the aperture width is slightly smaller than the image plane width of the film, and in which the pitches of the positioning pins and the pin holes of the left film and the positioning pins and the pin holes of the right film are stepwise different, so that the offsets of the left and right films can be adjusted by the differences of the film mounting pitches of the individual stereo slide mounts.

BRIEF DESCRIPTION OF THE DRAWINGS

FIG. 2 shows a base frame of the stereo slide mount of FIG. 1 and presents a front view at (a), a side view at (b), a bottom view at (c), and a back view at (d);

FIG. 3 shows a cover frame of the stereo slide mount of FIG. 1 and presents a front view at (a), a side view at (b), a bottom view at (c), and a back view at (d);

DETAILED DESCRIPTION OF THE PREFERRED EMBODIMENTS

The invention will be described in detail in the following in connection with its embodiments with reference to the accompanying drawings. FIG. 1 shows a #A stereo slide mount 1 of a zero film offset in a stereo slide mount system. This stereo slide mount 1 is constructed to include a base frame 2 formed by injection molding a resin, and a cover frame 3 superposed on the surface of the base frame 2. These base frame 2 and cover frame 3 are given identical contours and individually have a pair of left and right apertures 4L and 4R, and 5L and 5R formed in identical positions.

As shown in FIG. 2, the base frame 2 is provided with cylindrical positioning pins 6L and 6R, which are erected at the individual four corners of the left and right apertures 4L and 4R for coming into engagement with the perforations of the film. As shown in FIG. 3, the cover frame 3 is provided with pin holes 7L and 7R which are positioned to align with the positioning pins 6L and 6R of the base frame 2. On the other hand, the base frame 2 has a vertical groove 8 at the center of its back so that it can be folded into halves on the hinge of the vertical groove 8.

The stereo slide mount 1 is premised by mounting the film exposed by a stereoscopic camera which is symmetrically given the identical relative positions between the perforations and the image planes of the film. As shown in FIG. 2, the positioning pins 6L and 6R are so positioned that the film is set in a predetermined offset position with respect to the apertures 4L and 4R when the perforations at the left and right end portions of one frame of a slide film F, as cut at the center position of the perforations, are engaged with the positioning pins 6L and 6R of the base frame 2.

Figure 1A:
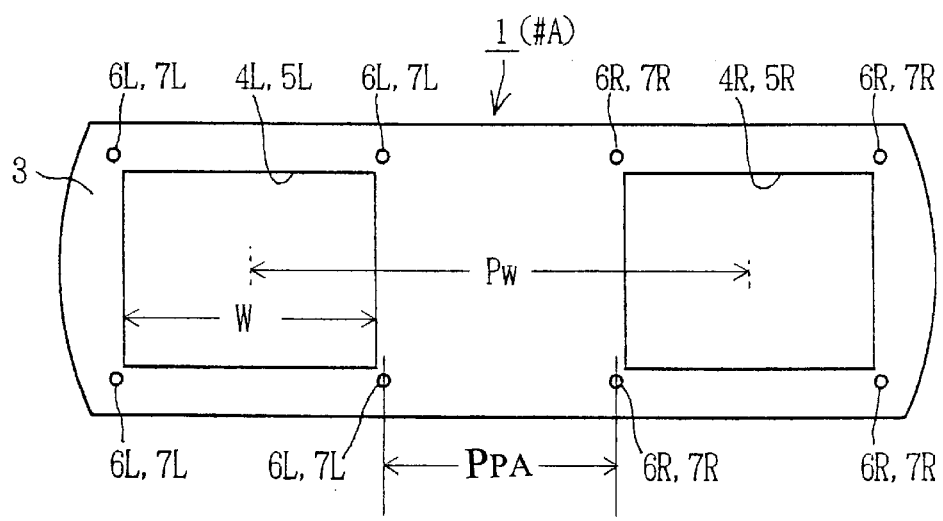
FIG. 1 shows a stereo slide mount of the invention and presents a front view at (a), a side view at (b), a bottom view at (c), and a back view at (d)
Figure 1B:
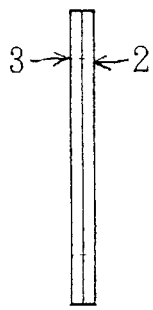
Figure 1C:
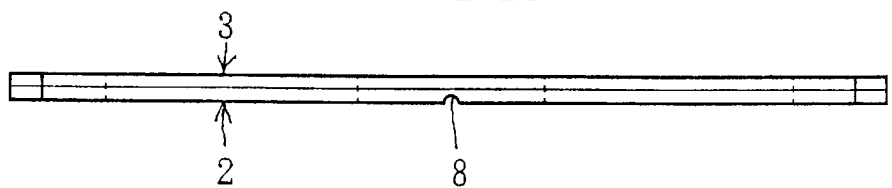
Figure 1D:
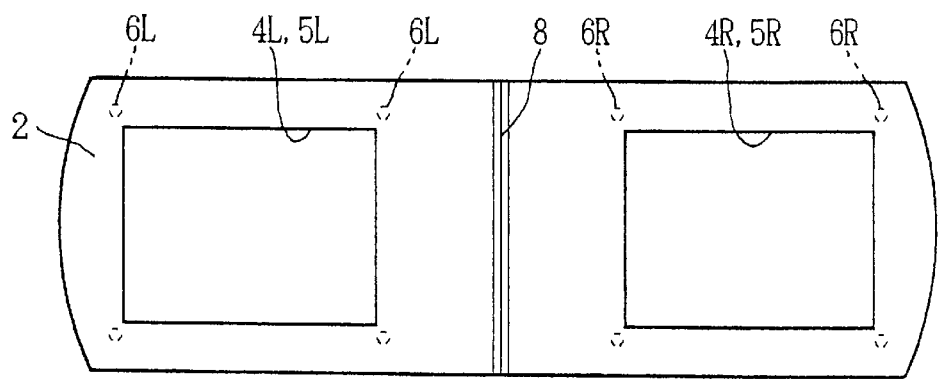
Figure 4A:
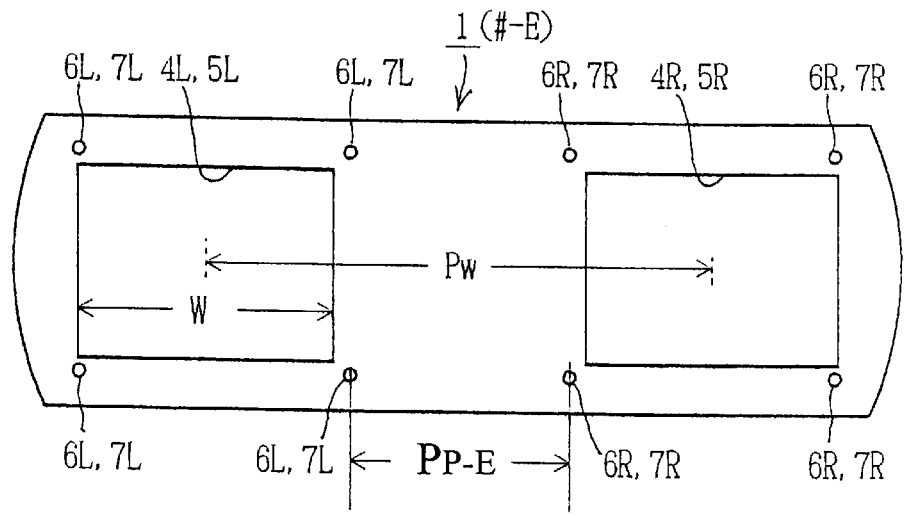
FIG. 4 shows a stereo slide mount of the invention, and presents a front view of a #–E mount, in which a film is offset inward, at (a), a front view of a #A mount of a zero film offset at (b), and a #E mount, in which the film is offset outward, at (c)
Figure 4B:
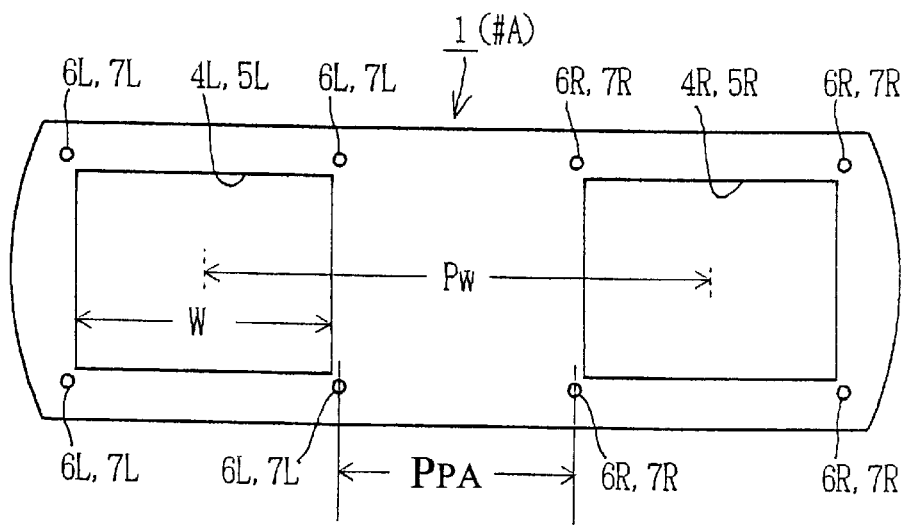
Figure 4C:
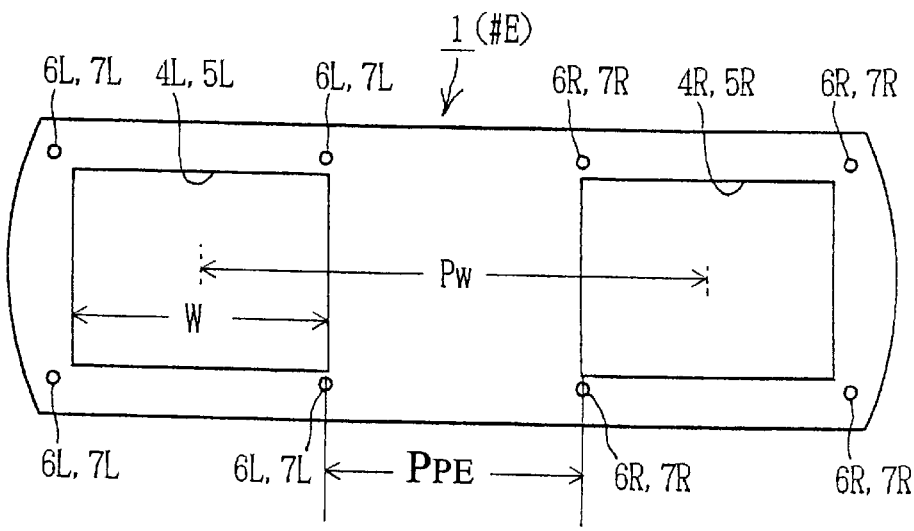
Figure 5A:
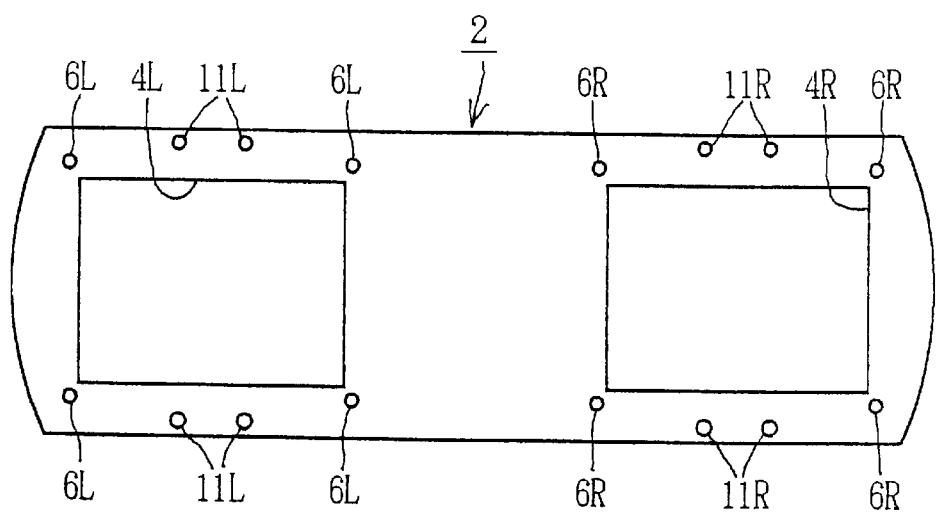
FIG. 5 shows another embodiment, and presents a front view of a base frame at (a), a side view of the base frame at (b), a front view of a cover frame at (c), and a side view of the cover frame at (d)
Figure 5B:
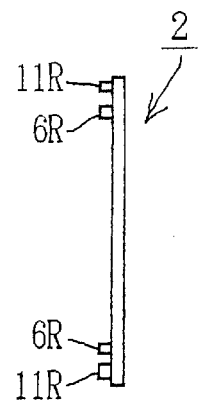
Figure 5C:
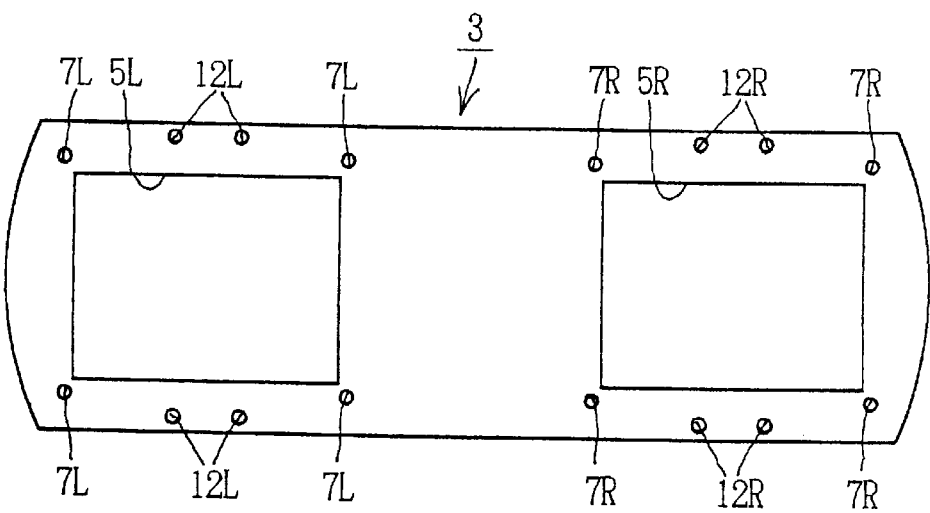
Figure 5D:
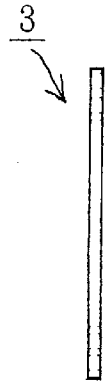

FIG. 4 shows the stereo slide mount system which is constructed of nine kinds of stereo slide mounts 1 (#–E, - - -, #A, - - -, and #E) which have stepwise different offsets in the lateral direction of the film. Although FIG. 4 shows three kinds of stereo slide mounts 1 (#–E, #A and #E) of the nine kinds, the number of mount steps should not be limited thereto.

The image plane apertures 4L and 4R, and 5L and 5R of the individual #–E to #E stereo slide mounts 1 have a constant width W, which is set to W=31 mm slightly narrower than the image plane width of 32 mm of the film. The left and right image plane apertures 4L and 4R, and 5L and 5R have a constant pitch $P_W$, but the pitch $P_P$ between the left film positioning positioning pine 6L and pin hole 7L and the right film positioning pin 6R and pin hole 7R, as located in the vicinity of the four corners of the image plane window, is increased/decreased by a unit of 0.125 mm for the individual mount numbers. Here, considering the observability using the stereo slide viewer, the pitch $P_W$ of the left and right apertures is desirably set to the standard value of 63.5 mm or slightly less of the interval of the two human eyes.

In the #A stereo slide mount 1, as shown in FIG. 4(b), the mounting pitch of the film and the pitch $P_W$ of the image plane apertures 4L and 4R, and 5L and 5R are equal so that the film offset is zero, and the outer end portion and the inner end portion of the image plane of the film are individually masked by 0.5 mm by the image plane apertures 4L and 4R, and 5L and 5R. Moreover, the outward offsets of the film with respect to the image plane apertures 4L and 4R, and 5L and 5R are increased in the plus direction in the order of #B, - - -, and #E so that the outer end portion of the image plane of the film is masked by 1 mm at #E. On the other hand, the film is offset inward with respect to the image plane apertures 4L and 4R, and 5L and 5R in the order of #–B, - - -, and #–E. At #–E, the film is offset inward by 1 mm with respect to the image plane apertures 4L and 4R, and 5L and 5R so that the inner end portion of the image plane of the film is masked by 1 mm.

Here, the stereo slide mounts of the minus numbers (#–B, - - -, and #–E) are used with the film on which an image was photographed in excess of parallax correction by a mistaken operation in the stereoscopic camera equipped with a manual type optical inter-axis distance adjusting mechanism. Usually, the parallax is corrected by adjusting the masking extent of the outer end portion of the image plane by the #A to #E stereo slide mounts.

When the stereo slide is to be mounted, the masking extent of the film is determined by the later-described masking extent guide device or another masking extent deciding means to select the stereo slide mount having an offset matching the masking extent. Then, the film is mounted in the left and right apertures 4L and 4R of the base frame 2 of the stereo slide mount selected, and the cover frame 3 and the base frame 2 are jointed by placing the cover frame 3 on the base frame 2 and by fitting the positioning pins 6L and 6R in the pin holes 7L and 7R.

Since the base frame 2 can be folded into two halves on the portion of the vertical groove 8, either the left half or the right half can be fitted earlier to position the positioning pins 6L and 6R and the pin holes 7L and 7R easily so that the efficiency of the mounting work is satisfactory. Since the surface of the cover frame 3 does not have any folding groove but is shaped flat, on the other hand, it is convenient to write a title or a photographic memo in the cover frame 3. Alternatively, a gap portion between the left and right apertures 5L and 5R of the cover frame 3 may be recessed to write a title or the like in the recess or to paste a title label to the recess.

Here in case the film has circular perforations or laterally elongated elliptical perforations, the its lateral and vertical positions are accurately kept only with the cylindrical positioning pins 6L and 6R by setting the diameters of the positioning pins 6L and 6R properly. In case the film has vertically elongated perforations as in the 135 film, the vertical positions may probably be inaccurate depending upon the diameter or shape of the positioning pins 6L and 6R.

Figure 6A:
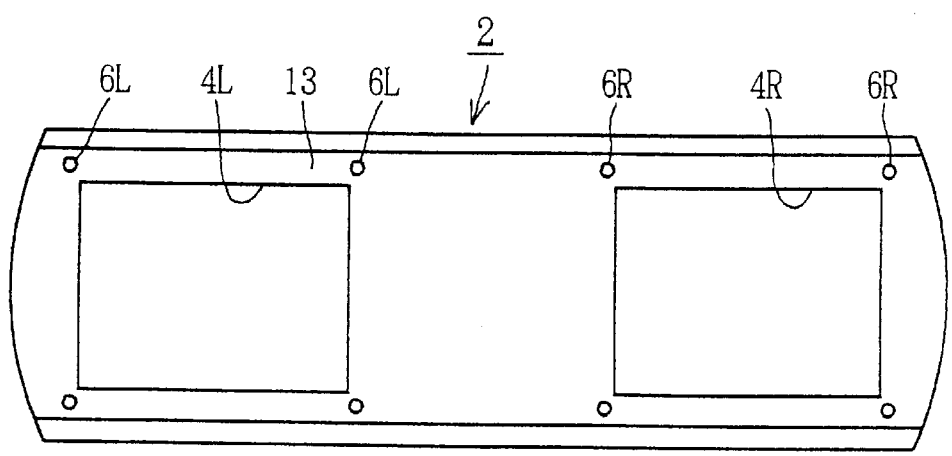
FIG. 6 shows another embodiment, and presents a front view of a base frame at (a) and a sectional side view of the base frame at (b)
Figure 6B:
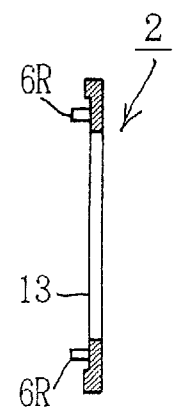

FIGS. 5 and 6 show embodiments in which the accuracy in the vertical positioning of the film is improved. As shown (a) and (b) in FIG. 5, the base frame 2 is provided with positioning pins 11L and 11R for regulating the vertical direction of the film, in addition to the positioning pins 6L and 6R for regulating the lateral positions of the film. As shown at (c) and (d) in FIG. 5, the cover frame 3 is provided with pin holes 7L and 7R, and 12L and 12R to be fitted on the positioning pins 6L and 6R, and 11L and 11R.

On the other hand, the base frame 2, as shown in FIG. 6, is provided at its vertical intermediate portion with a lateral groove 13 having a width equal to the vertical length of the film, so that the vertical position of the film is regulated, as in that shown in FIG. 5, by placing the film in the groove 13.

When the film is to be mounted on the stereo slide mount 1 of the invention, the proper image plane masking extent of a pair of stereoscopic photographs on the film strip is determined by the masking extent guide device, and the film, as cut by a unit of one frame, is mounted on the stereo slide mount having an offset matching the masking extent determined. Then, the paired left and right films can be positioned by the positioning pins 6L and 6R, and the portions of the left and right image planes can be masked to provide an accurate stereoscopic effect.

Figure 7:
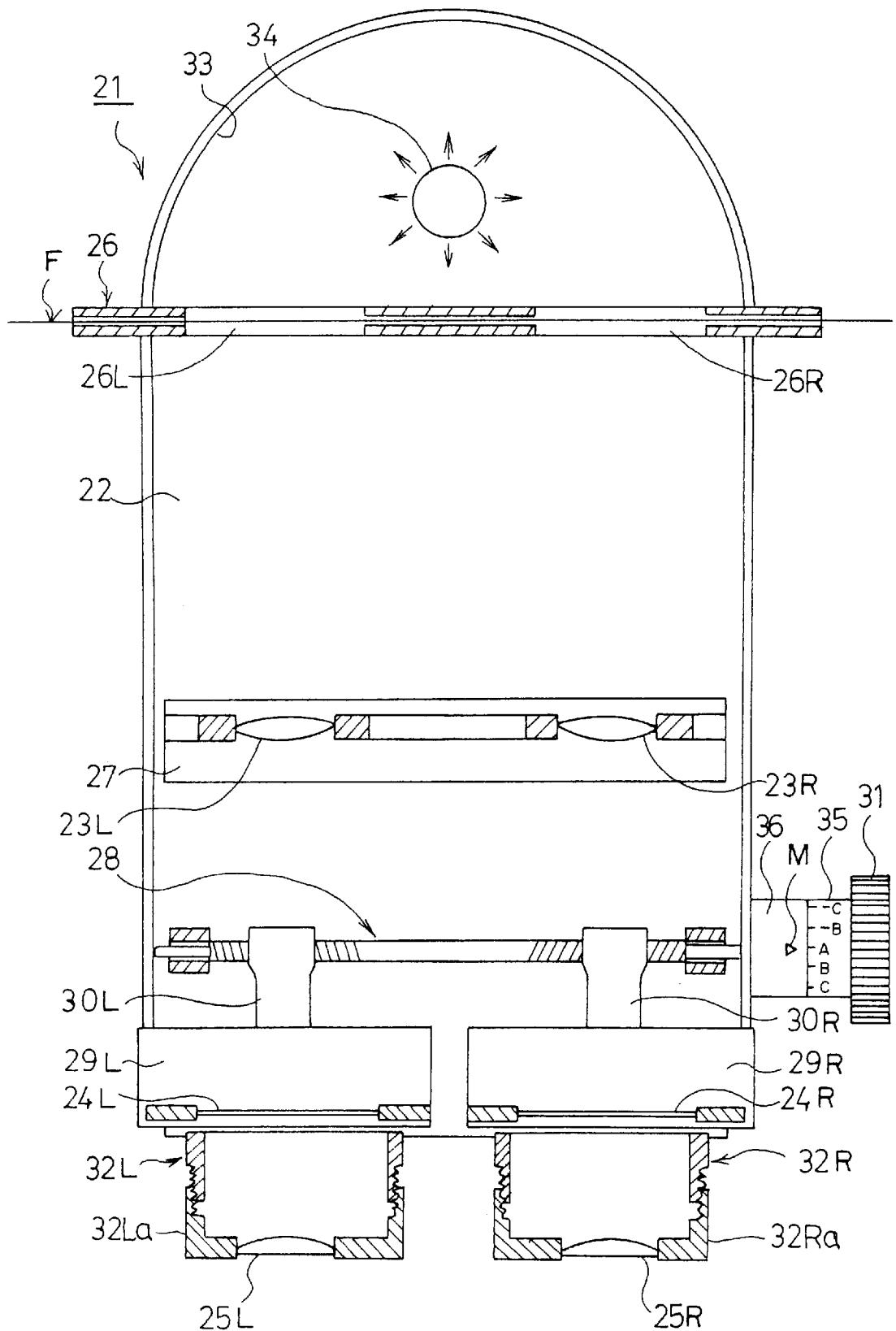
FIG. 7 is a sectional plan view of a masking extent guide device.

FIG. 7 shows one example of the masking extent guide device which is suited for selecting the stereo slide mount 1. The masking extent guide device 21, as shown, is constructed by providing a frame 22 with two left and right optical systems composed of projection lenses 23L and 23R, focusing screens 24L and 24R and eyepieces 25L and 25R, and by fixing a film guide 26 on the rear portion (as located at an upper portion of FIG. 7), so that the film strip F, loaded in the film guide 26, may be observed.

A lens board 27, as mounting the projection lenses 23L and 23R thereon, is fixed in an intermediate portion between the front and rear of the frame 22. Arms 30L and 30R, which are disposed in the front portion of the frame 22 and erect a feed screw 28 laterally and which are mounted on left and right focusing screen holders 29L and 29R, are internally threaded (although not shown) to receive the feed screw 28 by a ball-screw mechanism.

The feed screw 28 is threaded clockwise and counter-clockwise laterally symmetrically of its intermediate portion so that the pitch between the focusing screens 24L and 24R can be adjusted by turning a knob 31 at the end portion of the feed screw 28 clockwise to bring the left and right focusing screen holders 29L and 29R closer to each other at a right angle with respect to the optical axis and by turning the knob 31 counterclockwise to bring the left and right focusing screen holders 29L and 29R apart from each other.

Figure 8L:
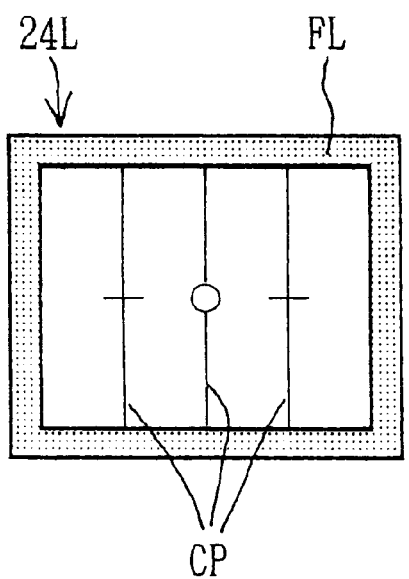
FIG. 8 presents individual front views of a focusing screen at (L) and (R).
Figure 8R:
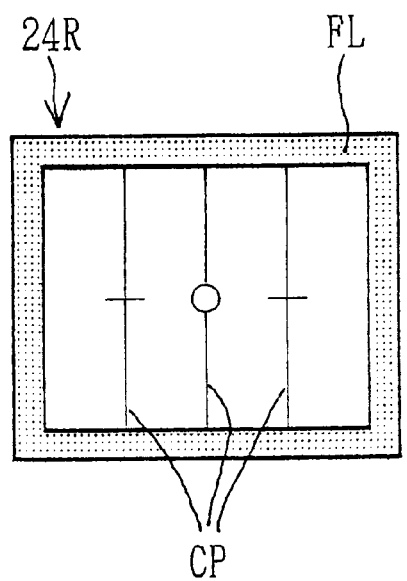

FIG. 8 shows the left and right focusing screens 24L and 24R, which are made identical to cover the image plane periphery with a frame FL of a shielding material or to masking the portion other than the image plane by painting the image plane periphery in black. The image plane width of the focusing screens 24L and 24R is set to the image plane aperture width 31 of the stereo slide mounts (#–E to #E)×a projection magnification γ, e.g., to the focusing screen width=31=1×31 mm for the projection magnification γ=1. On the image planes of the focusing screens 24L and 24R, there are formed by the printing or etching method left and right identical collimation patterns CP which are composed mainly of a plurality of vertical lines, thereby to improve the visibility of the matching change which is caused by the lateral relative motions of the left and right projection image planes.

In FIG. 7, eyepiece holders 32L and 32R, as located at the foremost portions to confront the focusing screens 24L and 24R, are equipped with the well-known expansion/contraction linkage mechanism, although not shown, which can be manually slid laterally symmetrically to adjust the eyepiece pitch to the pitch of the two eyes of the user. Like the ordinary optical device, moreover, the diopter can be adjusted by turning the front lens-tubes 32L*a* and 32R*a*.

A diffused light source is constructed to irradiate the back of the film guide 26 homogeneously by fixing a semicircular reflection plate 33 at the rear end portion of the film 22 and by mounting a photographic lamp 34 in the internal space which is defined by the reflection plate 33 and the film guide 26.

The film guide 26 is provided with left and right image plane apertures 26L and 26R with vertical and lateral sizes and a pitch, as corresponding to those of the image plane format of the stereoscopic camera, so that the image planes of a pair of stereoscopic photographs of the film strip F may be exposed to the insides of the image plane apertures 26L and 26R.

When the film strip F is to be mounted on the film guide 26, it is so inserted into the film guide 26 with its photo-sensitive emulsion face directed backward (toward the light source) that the left image plane of the paired stereoscopic photographs is positioned in the left image plane aperture 26L of the film guide 26 whereas the right image plane is positioned in the right image plane aperture 26R. The vertically/horizontally inverted image planes, as viewed from the front, in the image plane apertures 26L and 26R of the film guide 26 are focused as erected images on the focusing screens 24L and 24R through the projection lenses 23L and 23R so that the erected images can be stereoscopically observed through the left and right eyepieces 25L and 25R.

A dial 35, as mounted coaxially with the knob 31 at the end portion of the feed screw 28, is stamped with letters corresponding to the individual mount numbers (#–E to #E) of the stereo slide mount system, so that the centers of the focusing screens 24L and 24R are positioned on the straight lines joining the centers of the image planes of the film F and the principal points of the projection lenses 23L and 23R.

As the dial 35 is turned in the "+" direction from #A to #B, - - -, and #E, the left and right focusing screens 24L and 24R are offset in the direction toward each other so that the outer regions of the projected image planes are masked by the frames FL of the focusing screens 24L and 24R. Moreover, the offsets of the focusing screens 24L and 24R when the mark #E matches an index M are individually at 0.5 mm in the inward direction.

As the dial 35 is turned in the "−" direction from #A to #–B. - - -, and #–E, on the other hand, the left and right focusing screens 24L and 24R move from each other so that the inner regions of the projected image planes are masked by the frames FL of the focusing screens 24L and 24R. When the mark #–E matches the index M, the focusing screens 24L and 24R are individually offset outward by 0.5 mm.

At the aforementioned time of manipulating the dial, moreover, the perspective of the stereoscopic image with respect to the collimation patter CP fluctuates with the change in the masking extent. Therefore, the dial 35 is turned while observing the stereoscopic image so that the stereoscopic image may be observed either in a plane flush with or deep in the collimation pattern CP. If the numeral of the dial 35, as indicated by the fixed index M, is then observed in this state, the observer can find out that numeral of the stereo slide mount (#–E, - - -, and #E), which can establishes the parallax corrected state optimum for the stereoscopic photograph.

As has been described hereinbefore, the stereo slide mount of the invention can correct the accurate parallax of an object to observe a stereoscopic image of high quality if the film is mounted by selecting the stereo slide mount having the film offset which is determined by the image plane masking extent guide device or the like. Even if the film offsets are different according to the individual mounts, moreover, all the left and right image plane pitches are equal. As a result, even when the numerous stereo slide mounts having different film offsets are frequently changed, the optical angles of the visual lines of the left and right eyes are constant to provide an effect the eye fatigue is little.

Here, the invention should not be limited to the foregoing embodiments but can be modified in various manners within its technical range so that the invention will naturally cover those modifications.

What is claimed is:

1. A stereo slide mount having identical relative positions between perforations and its individual paired left and right photographic image planes, for mounting a stereo slide film on which an image has been photographed by a stereoscopic camera, comprising:

a base frame and a cover frame each having two square apertures juxtaposed to each other, said base frame being provided on its film mounting face with positioning pins for coming into engagement with the perforations of the slide film to be fixed, to position two slide films, and said cover frame being provided in its film holding face with pin holes corresponding to said positioning pins, so that said base frame and said cover frame are jointed by fitting said positioning pins in said pin holes, wherein a mount system is constructed of a plurality of kinds of stereo slide mounts in which left and right apertures have an equal pitch and an equal width, in which the aperture width is slightly smaller than the image plane width of the film, and in which the pitches of the positioning pins and the pin holes of the left film and the positioning pins and the pin holes of the right film are stepwise different, so that the offsets of the left and right films can be adjusted by the differences of the film mounting pitches of the individual stereo slide mounts.

2. A stereo slide mount according to claim 1, wherein said base frame has a hinge portion at its lateral center portion so that it can be freely folded.

* * * * *